(12) United States Patent
Petruska et al.

(10) Patent No.: US 8,353,222 B2
(45) Date of Patent: Jan. 15, 2013

(54) FORCE MEASURING DEVICE AND RELATED METHODS

(75) Inventors: Andrew J. Petruska, North Ogden, UT (US); Jeffrey R. Nostrom, Tremonton, UT (US); Amy M. Baesler, Ogden, UT (US); Rick R. Baird, Tremonton, UT (US)

(73) Assignee: Alliant Techsystems Inc., Arlington, VA (US)

( * ) Notice: Subject to any disclaimer, the term of this patent is extended or adjusted under 35 U.S.C. 154(b) by 377 days.

(21) Appl. No.: 12/797,127

(22) Filed: Jun. 9, 2010

(65) Prior Publication Data

US 2011/0307189 A1 Dec. 15, 2011

(51) Int. Cl.
*G01D 7/00* (2006.01)
(52) U.S. Cl. .............................. 73/862.041; 73/862.042
(58) Field of Classification Search ............ 73/862.041–862.046
See application file for complete search history.

(56) References Cited

U.S. PATENT DOCUMENTS

| 4,350,254 A * | 9/1982 | Noly ............................. 212/279 |
| 4,915,451 A * | 4/1990 | Forget et al. ................ 280/801.1 |
| 6,293,892 B1 * | 9/2001 | Slawinski et al. ............. 482/104 |
| 8,001,852 B2 * | 8/2011 | Laurent et al. ........... 73/862.451 |
| 2004/0050286 A1 * | 3/2004 | Liodden et al. ................ 105/148 |

* cited by examiner

*Primary Examiner* — Max Noori
(74) *Attorney, Agent, or Firm* — TraskBritt

(57) ABSTRACT

A testing apparatus and related methods are disclosed. In one embodiment, the testing apparatus may include a platform, a first plurality of cables, a second plurality of cables and a third plurality of cables, with each of the cables coupled to a respective load cell. The first plurality of cables may suspend the platform and be substantially parallel to each other. The second plurality of cables may be coupled to the platform, may be substantially parallel to each other cable of the second plurality of cables, and substantially perpendicular to each cable of the first plurality of cables. The third plurality of cables may be coupled to the platform, and each cable of the third plurality of cables may be substantially parallel to each other cable of the third plurality of cables, and substantially perpendicular to each cable of the first plurality of cables and the second plurality of cables.

19 Claims, 2 Drawing Sheets

FORCE MEASURING DEVICE AND RELATED METHODS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. FA8818-06-D-0022.

TECHNICAL FIELD

The invention, in various embodiments, relates to apparatus and methods for measuring one or more forces and moments associated with operation of a test article.

BACKGROUND

Precise measurement of magnitude and direction of relatively small forces and moments associated with such forces, attributable to operation of a gas generator or other pressurized vessel, is difficult. Without such precision, it is difficult, if not impossible, to compensate for a force, for example a thrust component, which is oriented in an undesired direction and/or has an undesirable magnitude.

BRIEF SUMMARY

In some embodiments, a testing apparatus may comprise a platform for mounting a test article, a first plurality of cables, a second plurality of cables and a third plurality of cables. The first plurality of cables may suspend the platform; each cable of the first plurality of cables may be coupled to a load cell and may be substantially parallel to each other cable of the first plurality of cables. The second plurality of cables may be coupled to the platform; each cable of the second plurality of cables may be coupled to a load cell, may be substantially parallel to each other cable of the second plurality of cables, and may be substantially perpendicular to each cable of the first plurality of cables. The third plurality of cables may be coupled to the platform; each cable of the third plurality of cables may be coupled to a load cell, may be substantially parallel to each other cable of the third plurality of cables, and may be substantially perpendicular to each cable of the first plurality of cables and the second plurality of cables.

In additional embodiments, a method of testing may include positioning a test article on a platform, which may be coupled to a plurality of cables and suspended by cables of the plurality of cables, and each cable of the plurality of cables may be coupled to a respective load cell of a plurality of load cells. The method may further include, measuring a gravity force with the plurality of load cells, measuring at least one additional force with the plurality of load cells, and calculating a force vector representing the at least one addition force relative to a selected origin.

In further embodiments, a testing apparatus may include a platform for mounting a test article and cables coupled to the platform. A first plurality of mutually parallel, vertical cables may suspend the platform from a support structure thereover, and each cable of the first plurality of cables may be coupled to a load cell secured to the support structure at a cable end distal from the platform. A second plurality of mutually, parallel, horizontal cables may be coupled to the platform, and each cable of the second plurality of cables may be coupled to a load cell at an end thereof distal from the platform. A third plurality of mutually parallel, horizontal cables may be coupled to the platform in perpendicular orientation to the second plurality of cables, each cable of the third plurality of cables coupled to a load cell at an end thereof distal from the platform.

DETAILED DESCRIPTION

Figure 1:
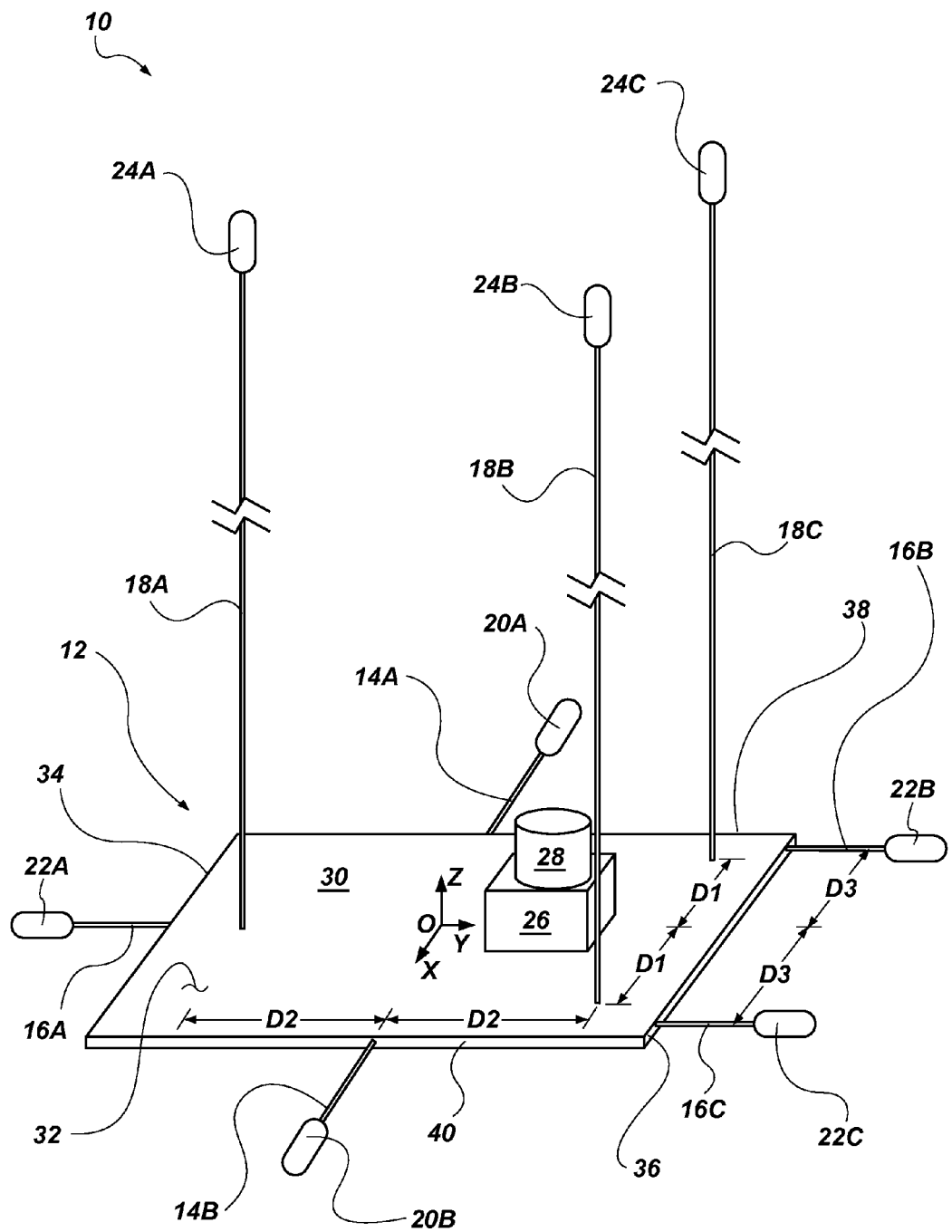
FIG. 1 shows an isometric view of a testing apparatus according to an embodiment of the invention.
Figure 2:
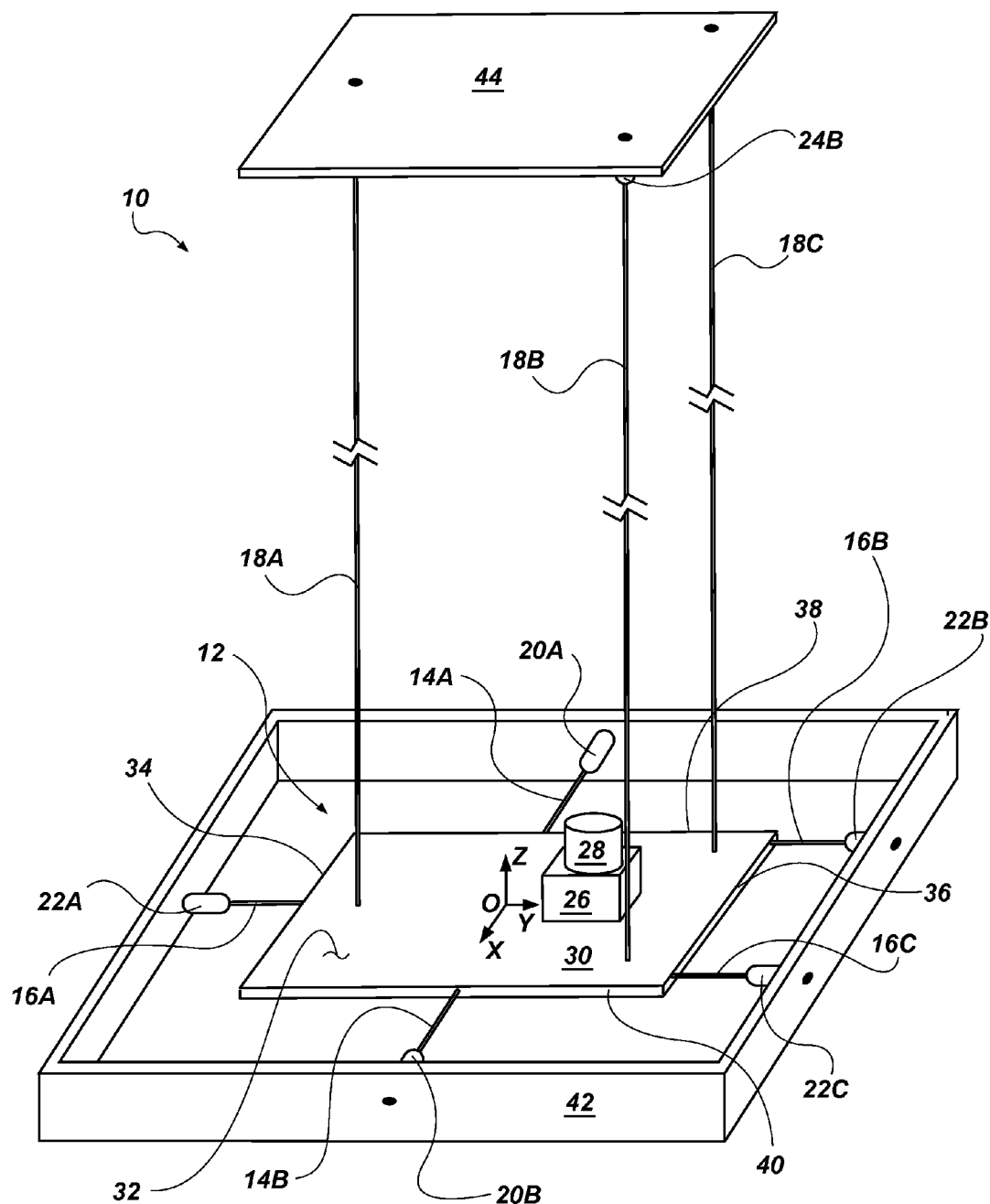
FIG. 2 shows an isometric view of the testing apparatus of FIG. 1 positioned within, and coupled to a fixed frame, and positioned below, and coupled to a fixed plate.

In some embodiments, as shown in FIG. 1, a testing apparatus 10 may include a suspended platform 12 coupled to a plurality of cables 14A, 14B, 16A, 16B, 16C, 18A, 18B, 18C. Each cable 14A, 14B, 16A, 16B, 16C, 18A, 18B, 18C may be coupled to a respective load cell 20A, 20B, 22A, 22B, 22C, 24A, 24B, 24C, and each load cell 20A, 20B, 22A, 22B, 22C, 24A, 24B, 24C may be anchored to a fixed structure (FIG. 2). Additionally, the suspended platform 12 may include a mounting structure 26 for the mounting of a test article 28.

The suspended platform 12 may be oriented according to a reference frame, and the reference frame may be selected to align with gravitational force (i.e., the gravitational force of earth) acting on the suspended platform. As a non-limiting example, the suspended platform may be oriented according to a three-dimensional Cartesian coordinate system having axes X, Y and Z intersecting at an origin O. The origin O may be located at any convenient location, such as a center of mass of the suspended platform 12, a geometric center of the suspended platform 12, or some other convenient location. The axis Z may be oriented to align parallel with the gravitational force (i.e., plumb, vertical) and the axes X and Y may be mutually perpendicular as well as perpendicular to the axis Z (i.e., level, horizontal).

In some embodiments, the suspended platform 12 may include a mounting plate 30, which may be a metal sheet shaped generally as a rectangular cuboid having a substantially planar mounting surface 32. However, the suspended platform 12 may be any of a variety of shapes and may not include a mounting plate 30 in some embodiments, as will be understood by a person of ordinary skill in the art. The optional mounting structure 26 may be positioned on the mounting surface 32 and may space the test article 28 away from the mounting surface 32.

The testing apparatus 10 may include eight cables 14A, 14B, 16A, 16B, 16C, 18A, 18B, 18C, such as two X-axis cables 14A, 14B extending in the direction of the axis X, three Y-axis cables 16A, 16B, 16C extending in the direction of the axis Y, and three Z-axis cables 18A, 18B, 18C extending in the direction of the axis Z. In view of this, the Z-axis cables 18A, 18B, 18C may extend substantially perpendicular to the mounting surface 32 of the mounting plate 30, substantially parallel to one another and substantially parallel to the gravitational field. The Y-axis cables 16A, 16B, 16C may extend substantially perpendicular to the Z-axis cables 18A, 18B, 18C and the X-axis cables 14A, 14B may extend substantially perpendicular to both the Y-axis cables 16A, 16B, 16C and the Z-axis cables 18A, 18B, 18C. Additionally, the X-axis cables 14A, 14B and the Y-axis cables 16A, 16B, 16C may each lie substantially within a single reference plane. As used herein, the term "cable" refers to any elongated structure that is capable of supporting a tensile force along its length, but capable of supporting relatively little compressive or shear force, such as one or more of cable, rope, and wire. Additionally, cables 14A, 14B, 16A, 16B, 16C, 18A, 18B, 18C may be selected that may experience relatively little deformation under the expected tensile loads, which may reduce noise in load data contributed by spring-like cable deformation, or may exhibit predictable deformation under the expected loads that may be filtered from any acquired data, or may be accounted for otherwise. Additionally, the X-axis cables 14A, 14B and the Y-axis cables 16A, 16B, 16C may be sized and positioned such that there is no significant tension on any of the Y-axis cables 16A, 16B, 16C and the X-axis cables 14A, 14B may be under a tension force, such as a tension force of about one-half the force range of the load cells 20A, 20B, when a test is not in progress (i.e., when there are no forces acting on the suspended platform 12 in the X- or Y-directions, and only gravity acting in the Z-direction). In view of this, the cables 14A, 14B, 16A, 16B, 16C, 18A, 18B, 18C may experience insignificant, or predictable, tensile forces resulting from forces acting on the suspended platform 12, and movement of the suspended platform 12, in a direction perpendicular to a central axis thereof. Additionally, the cables 14A, 14B, 16A, 16B, 16C, 18A, 18B, 18C may impart insignificant, or predictable, forces on the suspended platform 12 in a direction perpendicular to a central axis of the particular cable 14A, 14B, 16A, 16B, 16C, 18A, 18B, 18C when the suspended platform moves or is deflected by forces during testing operations.

A center of the suspended platform 12 may be positioned between the Z-axis cables 18A, 18B, 18C, such that substantially all of the weight (i.e., the gravitational force) of the suspended platform 12 and any test article mounted thereon may be supported by the Z-axis cables 18A, 18B, 18C, which are, in turn, secured to at least one support structure above the suspended platform 12. As used herein, the term "center" may refer to one or more of a center of mass and a geometric center. One of the Z-axis cables 18A may be substantially aligned with a longitudinal center of the suspended platform 12 and may be coupled to the suspended platform 12 near a first end 34 of the suspended platform 12. The other Z-axis cables 18B, 18C may be coupled to the suspended platform 12 near an opposing, second end 36 of the suspended platform 12 and may be spaced from the longitudinal center of the suspended platform 12, such that the longitudinal center of the suspended platform 12 may be located between the other Z-axis cables 18B, 18C. The X-axis cables 14A, 14B may each be substantially aligned with a lateral center of the suspended platform 12 and may be coupled to a third side 38 and an opposing fourth side 40 of the suspended platform 12, respectively. Additionally, one of the Y-axis cables 16A may be aligned with the longitudinal center of the suspended platform 12 and coupled to the suspended platform 12 near the first end 34 of the suspended platform 12, near the Z-axis cable 18A and the other Y-axis cables 16B, 16C may be positioned at the opposing, second end 36 of the platform, near the other Z-axis cables 18B, 18C. The Y-axis cables 16B, 16C at the second end 36 of the suspended platform 12 may be spaced from the center of the suspended platform 12, such that the center of the suspended platform 12 may be located between the Y-axis cables 16B, 16C at the second end 36 of the suspended platform 12. Additionally, each of the X-axis cables 14A, 14B, Y-axis cables 16A, 16B, 16C and Z-axis cables 18A, 18B, 18C may be substantially longer than an expected displacement of the platform 12 during testing operations. For example, each of the X-axis cables 14A, 14B, Y-axis cables 16A, 16B, 16C and Z-axis cables 18A, 18B, 18C may be at least one-hundred (100) times longer than an expected displacement of the platform 12 during testing operations.

Each cable 14A, 14B, 16A, 16B, 16C, 18A, 18B, 18C may be coupled to a respective force measuring device, such as a load cell 20A, 20B, 22A, 22B, 22C, 24A, 24B, 24C, that may be utilized to measure a force asserted on each cable 14A, 14B, 16A, 16B, 16C, 18A, 18B, 18C, respectively. For example, a distal end (relative to the suspended platform 12) of each cable 14A, 14B, 16A, 16B, 16C, 18A, 18B, 18C may be coupled to a load cell 20A, 20B, 22A, 22B, 22C, 24A, 24B, 24C and each load cell 20A, 20B, 22A, 22B, 22C, 24A, 24B, 24C may be anchored to a fixed structure (FIG. 2). In some embodiments, the load cells 20A, 20B, 22A, 22B, 22C, 24A, 24B, 24C may be configured as S-beam load cells. However, other load cell configurations and other force measuring devices that are known to those of ordinary skill in the art may be utilized.

In some embodiments, such as shown in FIG. 2, the suspended platform 12 may be positioned within a reference structure in the form of a fixed frame 42 and may be positioned below a support structure in the form of a fixed plate 44. The fixed plate 44 may be shaped and sized substantially the same as the mounting plate 30 of the suspended platform 12, which may facilitate the accurate mounting locations of the ends of the Z-axis cables 18A, 18B, 18C and the load cells 24A, 24B, 24C attached thereto. The fixed frame 42 may be a rectangular frame having a shape generally similar to an outer shape of the mounting plate 30, which may facilitate the accurate mounting locations of the ends of the X-axis cables 14A, 14B and the Y-axis cables 16A, 16B, 16C and the load cells 20A, 20B, 22A, 22B, 22C attached thereto. In view of the foregoing, the cables 14A, 14B, 16A, 16B, 16C, 18A, 18B, 18C and load cells 20A, 20B, 22A, 22B, 22C, 24A, 24B, 24C may be positioned and configured such that a significant force applied to the suspended platform 12 in any direction by a test article 28 may be measured by at least one load cell 20A, 20B, 22A, 22B, 22C, 24A, 24B, 24C.

The location of each of the cables 14A, 14B, 16A, 16B, 16C, 18A, 18B, 18C relative to a reference location on the suspended platform, such as a center of the mounting surface (i.e., the origin O), may be measured to facilitate the analysis of data acquired during testing of a test article 28 on the suspended platform 12. For testing operations, a test article 28, such as a gas generator, may be mounted to the suspended platform 12. The location of a feature of the test article 28, such as the position of a nozzle of the test article 28, may be measured relative to the reference location (i.e., the origin O) on the suspended platform 12.

In test operations, after the test article 28 is mounted onto the suspended platform 12, the force applied to each Z-axis cable 18A, 18B, 18C may be measured by the load cells 24A, 24B, 24C. The measured force applied to each Z-axis cable 18A, 18B, 18C may then be utilized to subtract the gravitational force from additional forces measured during a test to isolate force measurements of interest, such as thrust measurements, from the gravitational force. Additionally, the test article 28 may be oriented on the mounting structure 26 of the suspended platform 12 such that any forces generated by the test article 28 that may exceed the gravitational force acting on the suspended platform 12 may act in a direction that does not oppose the gravitational force. For example, if the test article 28 is a gas generator, any thrust generating nozzles may be oriented in a direction that does not directly oppose the gravitational force if the thrust therefrom is expected to exceed the gravitational force.

After any initial measurements are taken, such as weight measurements (i.e., the gravitational force), the test article may be tested and force measurements may be measured substantially simultaneously by each of the load cells 20A, 20B, 22A, 22B, 22C, 24A, 24B, 24C during the test period and the measurements may be recorded, such as by one or more of analog and digital equipment. For example, each of the load cells 20A, 20B, 22A, 22B, 22C, 24A, 24B, 24C may be coupled to and in communication with a computer, or another data acquisition device, and the force measurements from each of the load cells 20A, 20B, 22A, 22B, 22C, 24A, 24B, 24C may be recorded on a computer readable storage media, or some other data storage media (not shown). The force measurements may be substantially continuously recorded or may be recorded at selected time intervals. Additionally, each recorded force measurement may be correlated to a position and a time. In view of this, a measurement from each of the load cells 20A, 20B, 22A, 22B, 22C, 24A, 24B, 24C correlated to a specific time may be utilized, along with a relative position of each load cell 20A, 20B, 22A, 22B, 22C, 24A, 24B, 24C to calculate a force vector in three-dimensional space at that specific time. Furthermore, the measurement from each of the load cells 20A, 20B, 22A, 22B, 22C, 24A, 24B, 24C correlated to the specific time may be correlated according to the measured force magnitude and the relative positions to determine a torque vector at that specific time.

In some embodiments, the measured force magnitude of the load cells at one side of the origin O (i.e., load cells 20A and 22A) may be assigned a positive value and measured force magnitude of the load cells at the opposing side of the origin O (i.e., load cells 20B, 22B, 22C, 24A, 24B and 24C) may be assigned a negative value. The measurement from each of the load cells 20A, 20B of the X-axis cables 14A, 14B may then be summed together to determine the force component of interest in the X-direction. Likewise, the measurement from each of the load cells 22A, 22B, 22C of the Y-axis cables 16A, 16B, 16C may be summed together to determine the force component of interest in the Y-direction. The measurement from each of the load cells 24A, 24B, 24C of the Z-axis cables 18A, 18B, 18C may be summed together to determine a total force component in the Z-direction and an initial weight measurement may be subtracted from the total force component in the Z-direction to determine a force component of interest in the Z-direction. Additionally, the force components of interest in each of the X-, Y- and Z-directions may then be combined to provide a single force vector of interest.

Furthermore, torque measurements may be calculated by multiplying the measured force of a particular load cell 20A, 20B, 22A, 22B, 22C, 24A, 24B, 24C and a distance from one of the X-, Y- and Z-axes. The distance utilized may be determined by calculating the shortest distance from a longitudinal axis of the particular cable 14A, 14B, 16A, 16B, 16C, 18A, 18B, 18C associated with the load cell 20A, 20B, 22A, 22B, 22C, 24A, 24B, 24C and a plane that lies on two of the X-, Y- and Z-axes. For example, a measured force by a Z-axis load cell 24B, 24C may be multiplied by the distance D1 (FIG. 1) from a longitudinal axis of the associated Z-axis cable 18B, 18C and the Y-Z plane (i.e., the plane that lies on both the Y-axis and the Z-axis) to determine a torque about the Y-axis. A measured force by a Z-axis load cell 24B, 24C may be multiplied by the distance D2 (FIG. 1) from a longitudinal axis of the associated Z-axis cable 18B, 18C and the X-Z plane (i.e., the plane that lies on both the X-axis and the Z-axis) to determine a torque about the X-axis. A measured force by a Y-axis load cell 22B, 22C may be multiplied by the distance D3 (FIG. 1) from a longitudinal axis of the associated Y-axis cable 16B, 16C and the Y-Z plane (i.e., the plane that lies on both the Y-axis and the Z-axis) to determine a torque about the Z-axis. A measured force by a Y-axis load cell 22A, 22B, 22C may be multiplied by the distance from a longitudinal axis of the associated Y-axis cable 16A, 16B, 16C and the X-Y plane (i.e., the plane that lies on both the X-axis and the Y-axis; note that, for the embodiments shown in FIGS. 1 and 2, this distance is zero) to determine a torque about the X-axis. A measured force by an X-axis load cell 20A, 20B may be multiplied by the distance from a longitudinal axis of the associated X-axis cable 14A, 14B and the X-Y plane (i.e., the plane that lies on both the X-axis and the Y-axis; note that, for the embodiments shown in FIGS. 1 and 2, this distance is zero) to determine a torque about the Y-axis. A measured force by a X-axis load cell 20A, 20B may be multiplied by the distance from a longitudinal axis of the associated X-axis cable 14A, 14B and the X-Z plane (i.e., the plane that lies on both the X-axis and the Z-axis; note that, for the embodiments shown in FIGS. 1 and 2, this distance is zero) to determine a torque about the Z-axis. Each of these torque measurements may then be combined to provide a single torque vector. Note, the initial weight measurements may be subtracted from the measured forces prior to calculating the torques, or one or more torque vectors calculated using the initial weight may be subtracted from the calculated torque vectors, to isolate the torque of interest from torque due to the gravitational force.

Additionally, a center of mass of the suspended platform 12, including the test article 28, may be calculated utilizing the differences in measured forces by the Z-axis load cells 24A, 24B, 24C, and the known positions of the Z-axis cables 18A, 18B, 18C. Furthermore, the calculated moment vector may be recalculated relative to the calculated center of mass by mathematically shifting the reference frame from a known location (i.e., origin O) to the calculated center of mass, such as by linear algebra techniques.

In one embodiment, provided as an example and not a limitation, the test apparatus 10 may be capable of accurately measuring forces, such as thrust, ranging between about 0.01 pounds force (about 0.04 newtons) to about 15 pounds force (about 67 newtons) in any direction.

Although this invention has been described with reference to particular embodiments, the invention is not limited to these described embodiments. Rather, the invention is limited only by the appended claims, which include within their scope all equivalent devices, systems and methods. Additions, deletions, and modifications to the disclosed embodiments may be effected without departing from the scope of the invention as claimed herein. Similarly, features from one embodiment may be combined with those of another while remaining within the scope of the invention.

What is claimed is:
1. A testing apparatus comprising:
   a platform for mounting a test article;
   a first plurality of cables suspending the platform, each cable of the first plurality of cables coupled to a load cell and substantially parallel to each other cable of the first plurality of cables;
   a second plurality of cables coupled to the platform, each cable of the second plurality of cables coupled to a load cell, substantially parallel to each other cable of the second plurality of cables, and substantially perpendicular to each cable of the first plurality of cables; and
   a third plurality of cables coupled to the platform, each cable of the third plurality of cables coupled to a load cell, substantially parallel to each other cable of the third plurality of cables, and substantially perpendicular to each cable of the first plurality of cables and the second plurality of cables.

2. The testing apparatus of claim 1, wherein each of the second plurality of cables and the third plurality of cables are oriented substantially upon a single plane.

3. The testing apparatus of claim 1, wherein each cable of the first plurality of cables has a longitudinal axis aligned with a gravitational field.

4. The testing apparatus of claim 3, wherein each cable of the second plurality of cables and the third plurality of cables has a longitudinal axis oriented substantially perpendicular to a gravitational field.

5. The testing apparatus of claim 1, wherein each load cell is configured for communication with a computer.

6. The testing apparatus of claim 1, wherein each cable of the first plurality of cables, the second plurality of cables and the third plurality of cables is substantially longer than an expected displacement of the platform.

7. The testing apparatus of claim 6, wherein each cable of the first plurality of cables, the second plurality of cables and the third plurality of cables is at least one hundred times longer than the expected displacement of the platform.

8. The testing apparatus of claim 1, wherein the first plurality of cables comprises three cables.

9. The testing apparatus of claim 8, wherein a center of mass of the platform is positioned between the cables of the first plurality of cables.

10. The testing apparatus of claim 1, wherein each load cell is coupled to an end of each cable that is distal from the platform.

11. The testing apparatus of claim 1, wherein the second plurality of cables comprises three cables and the third plurality of cables comprises two cables.

12. The testing apparatus of claim 11, wherein each cable of the second plurality of cables is free of any significant tension and each cable of the third plurality of cables is under a tension load, when only a gravitational force is acting on the platform.

13. A method of testing, the method comprising:
   positioning a test article on a platform coupled to a plurality of cables and suspended by some cables of the plurality of cables, each cable of the plurality of cables coupled to a respective load cell of a plurality of load cells;
   measuring a gravity force with load cells coupled to the some cables of the plurality of load cells;
   measuring at least one additional force with the plurality of load cells; and
   calculating a force vector representing the at least one addition force relative to a selected origin.

14. The method of claim 13, further comprising calculating a torque vector representing the torque applied by the at least one addition force relative to the selected origin.

15. The method of claim 13, further comprising:
   simultaneously measuring the gravity force and the at least one additional force; and
   isolating the at least one additional force from the gravity force.

16. The method of claim 13, wherein measuring at least one additional force with the plurality of load cells comprises measuring a thrust force with the plurality of load cells.

17. The method of claim 13, wherein measuring at least one additional force with the plurality of load cells comprises measuring a force ranging between about 0.01 pound force to about 15 pounds force.

18. The method of claim 13, further comprising:
   measuring a plurality of force measurements with the plurality of load cells; and
   recording force measurements of the plurality of force measurements at selected time intervals.

19. A testing apparatus comprising:
   a platform for mounting a test article;
   a first plurality of mutually parallel, vertical cables suspending the platform from a support structure thereover, each cable of the first plurality of cables coupled to a load cell secured to the support structure at a cable end distal from the platform;
   a second plurality of mutually, parallel, horizontal cables coupled to the platform, each cable of the second plurality of cables coupled to a load cell at an end thereof distal from the platform; and
   a third plurality of mutually parallel, horizontal cables coupled to the platform in perpendicular orientation to the second plurality of cables, each cable of the third plurality of cables coupled to a load cell at an end thereof distal from the platform.

* * * * *

UNITED STATES PATENT AND TRADEMARK OFFICE
CERTIFICATE OF CORRECTION

PATENT NO. : 8,353,222 B2  
APPLICATION NO. : 12/797127  
DATED : January 15, 2013  
INVENTOR(S) : Andrew J. Petruska et al.

Page 1 of 1

It is certified that error appears in the above-identified patent and that said Letters Patent is hereby corrected as shown below:

In the specification:

COLUMN 6, LINE 40,     change "pounds force (about 0.04 newtons)" to --pound force (about 0.04 newton)--

Signed and Sealed this  
Eighth Day of September, 2015

Michelle K. Lee  
*Director of the United States Patent and Trademark Office*